(12) United States Patent
Taylor et al.

(10) Patent No.: US 9,025,437 B2
(45) Date of Patent: *May 5, 2015

(54) SYSTEM AND METHOD FOR PROVIDING IMPROVED FAILOVER PERFORMANCE FOR PSEUDOWIRES

(71) Applicant: Cisco Technology, Inc., San Jose, CA (US)

(72) Inventors: Adam Laurence Taylor, Acton, MA (US); Muhammad Yousuf, Milpitas, CA (US); James Ronald Holland, Jr., Raleigh, NC (US); Neil McGill, Linlithgow (GB); Sudhir Kumar Rustogi, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,392

(22) Filed: Jul. 2, 2013

(65) Prior Publication Data

US 2013/0286823 A1 Oct. 31, 2013

Related U.S. Application Data

(63) Continuation of application No. 12/965,435, filed on Dec. 10, 2010, now Pat. No. 8,553,533.

(51) Int. Cl.
*G01R 31/08* (2006.01)
*H04L 12/28* (2006.01)
*H04L 12/703* (2013.01)
*H04L 12/24* (2006.01)

(52) U.S. Cl.
CPC ............ *H04L 45/28* (2013.01); *H04L 41/0663* (2013.01); *H04L 41/08* (2013.01)

(58) Field of Classification Search
CPC ......... H04L 45/22; H04L 45/28; H04L 45/68; H04L 45/70
USPC ......... 370/216–219, 242, 244, 245, 397, 392, 370/396, 389, 400, 401, 225–228
See application file for complete search history.

(56) References Cited

U.S. PATENT DOCUMENTS

| 7,707,277 B2 | 4/2010 | Lange et al. |
| 7,782,841 B2 | 8/2010 | Rampal et al. |
| 7,940,652 B1 * | 5/2011 | Pan ............................... 370/228 |

(Continued)

FOREIGN PATENT DOCUMENTS

| CN | 1874298 A | 12/2006 |
| CN | 1878135 A | 12/2006 |

(Continued)

OTHER PUBLICATIONS

"U.S. Appl. No. 12/965,435, Notice of Allowance mailed Feb. 28, 2013", 8 pgs.

(Continued)

*Primary Examiner* — Hanh N Nguyen

(57) ABSTRACT

Grouping pseudowires based on hardware interfaces and configured control paths enables improved pseudowire failover performance. Signaling status changes (e.g., from standby to active status) is facilitated by using group IDs for the pseudowire groups, thereby enabling improved failover performance when there is disruption in the network.

20 Claims, 12 Drawing Sheets

(56) References Cited

U.S. PATENT DOCUMENTS

| | | | |
|---|---|---|---|
| 7,961,599 B2 * | 6/2011 | Proulx | 370/218 |
| 8,553,533 B2 * | 10/2013 | Taylor et al. | 370/219 |
| 8,780,699 B1 * | 7/2014 | Hasan | 370/219 |
| 2007/0008982 A1 | 1/2007 | Voit et al. | |
| 2008/0253367 A1 | 10/2008 | Ould-brahim | |
| 2008/0270580 A1 | 10/2008 | Lange et al. | |
| 2009/0161533 A1 | 6/2009 | Ballantyne et al. | |
| 2009/0296568 A1 | 12/2009 | Kitada | |
| 2010/0238795 A1 | 9/2010 | Boutros et al. | |
| 2011/0242988 A1 | 10/2011 | Rustogi et al. | |
| 2012/0147737 A1 | 6/2012 | Taylor et al. | |

FOREIGN PATENT DOCUMENTS

| | | | |
|---|---|---|---|
| CN | 101043386 A | | 9/2007 |
| CN | 101141330 A | | 3/2008 |
| CN | 101267360 A | | 9/2008 |
| CN | 101584162 A | | 11/2009 |
| CN | 101902353 A | | 12/2010 |
| WO | WO-2012079026 A2 | | 6/2012 |

OTHER PUBLICATIONS

"International Application Serial No. PCT/US2011/064245, Search Report mailed Mar. 1, 2012", 2 pgs.

"International Application Serial No. PCT/US2011/064245, Written Opinion mailed Mar. 1, 2012", 6 pgs.

Andersson, L., et al. (Eds.), "LDP Specification", Network Working Group, Request for Comments: 5036, (Oct. 2007), 136 pgs.

Bryant, S., et al. (Eds.), "Pseudo Wire Emulation Edge-to-Edge (PWE3) Architecture", Network Working Group, Request for Comments: 3985, (Mar. 2005), 43 pgs.

Martini, L., et al. (Eds.), "Pseudowire Setup and Maintenance Using the Label Distribution Protocol (LDP)", Network Working Group, Request for Comments 4447, (Apr. 2006), 34 pgs.

Muley, P., et al. (Eds.), "Pseudowire (PW) Redundancy", IETF, Network Working Group, draft-ietf-pwe3-redundancy-03.txt, (May 14, 2010), 15 p.

Office Action in Chinese Application No. 201180059603.3, mailed Dec. 3, 2014, 14 pages.

* cited by examiner

SYSTEM AND METHOD FOR PROVIDING IMPROVED FAILOVER PERFORMANCE FOR PSEUDOWIRES

CROSS REFERENCE TO RELATED APPLICATIONS

This application is a continuation of U.S. application Ser. No. 12/965,435, filed on Dec. 10, 2010, which is incorporated herein by reference in its entirety.

BACKGROUND

1. Technical Field

The present disclosure relates generally to communication networks and more particularly to pseudowire configurations in communication networks.

2. Description of Related Art

Virtual Private Network (VPN) services provide secure network connections between different locations. A company, for example, can use a VPN to provide secure connections between geographically dispersed sites that need to access the corporate network so that each customer edge (CE) end point or node can communicate directly and independently with all other CE nodes. Different types of VPNs have been classified by the network layer used to establish the connection between the customer and provider network. For example, Virtual Private LAN Service (VPLS) is an architecture that delivers a multipoint Layer 2 VPN (L2VPN) service that in all respects emulates an Ethernet Local Area Network (LAN) across a wide metropolitan geographic area. All services in a VPLS appear to be on the same LAN, regardless of location. In other words, with VPLS, customers can communicate as if they were connected via a private Ethernet segment, i.e., multipoint Ethernet LAN services.

In this context, each CE device at a customer site is connected to the service provider network at a provider edge (PE) device by an Attachment Circuit (AC) that provides the customer connection to a service provider network, that is, the connection between a CE node and its associated PE node. Within the provider network, each PE device includes a Virtual Switch Instance (VSI) that emulates an Ethernet bridge (i.e., switch) function in terms of Media Access Control (MAC) address learning and forwarding in order to facilitate the provisioning of a multipoint L2VPN. A pseudowire (PW) is a virtual connection between two PE devices that connect two attachment circuits. In the context of the VPLS service, a pseudowire can be thought of as a point-to-point virtual link for each offered service between a pair of VSIs. Therefore, if each VSI can be thought of as a virtual Ethernet switch for a given customer service instance, then each pseudowire can be thought of as a virtual link connecting these virtual switches to each other over a Packet Switched Network (PSN) for that service instance.

Since the failure of pseudowires obviously degrades network performance, some effort has been directed towards adding system redundancies including redundant pseudowires. However, the presence of redundant pseudowires alone is insufficient to improve overall failover performance, that is, the ability to switch over automatically to a redundant or backup system. Thus, there is a need for improved methods for managing pseudowires to facilitate pseudowire switching and enable improved failover performance.

DETAILED DESCRIPTION OF EXAMPLE EMBODIMENTS

Overview

Figure 1:
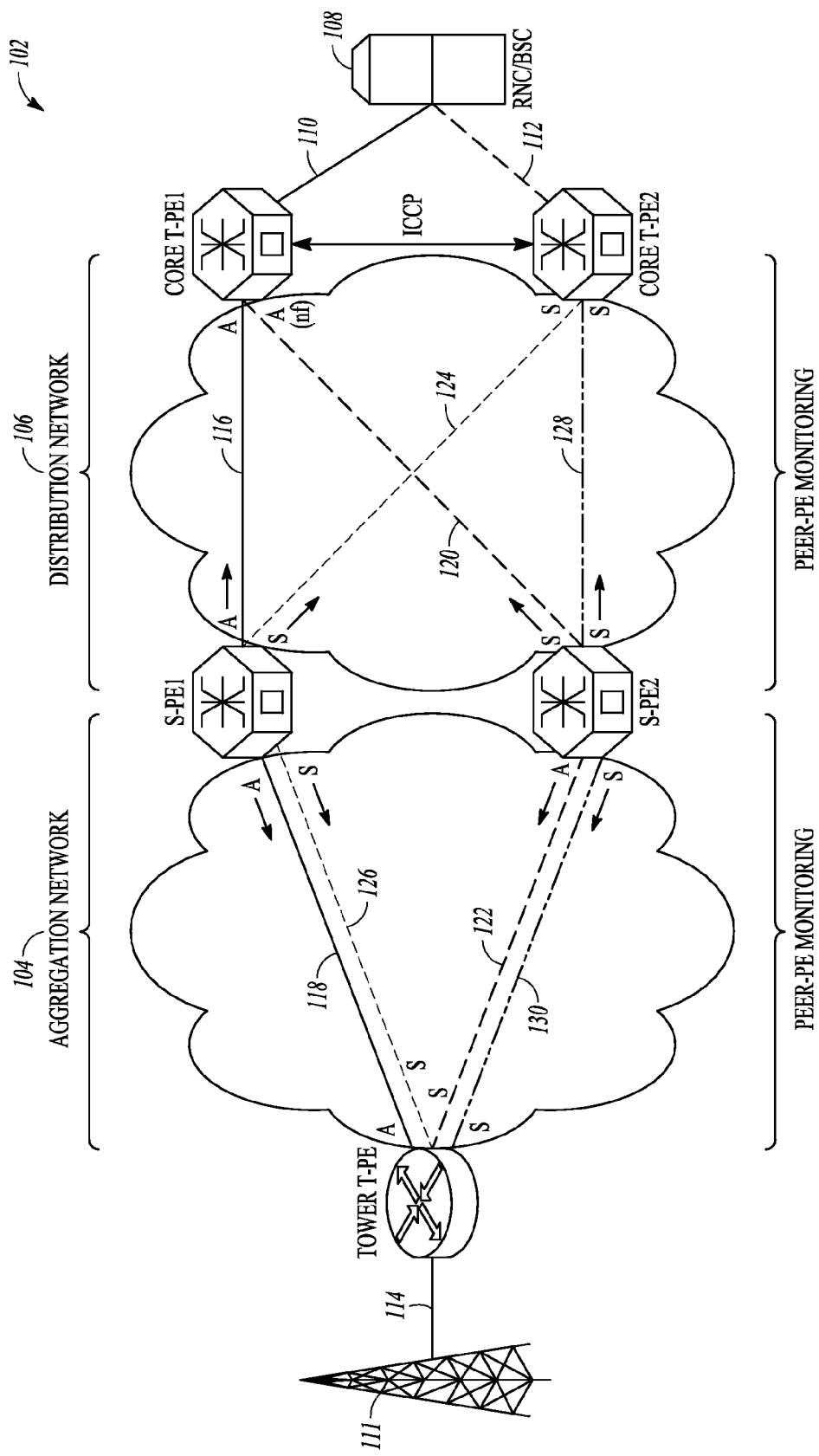
FIG. 1 shows an example reference network model with applications to example embodiments disclosed herein.

According to one embodiment, a method of providing improved pseudowire performance includes specifying a physical interface at a first PE node in a network, a first control path from the first PE node to a second PE node in the network, and a second control path from the first PE node to a third PE node in the network. With these specifications, the method then includes specifying redundant combinations of pseudowires, where each redundant combination includes a primary pseudowire that is configured as a virtual circuit between the physical interface of the first PE node and the second PE node, and a backup pseudowire that is configured as a virtual circuit between the physical interface of the first PE node and the third PE node. Then these pseudowires can be grouped into a primary PW group that includes the primary pseudowires and a backup PW group that includes the backup pseudowires. Group identifiers for the primary PW group and the backup PW group can then be used to assign an active status to the primary pseudowires and a standby status to the backup pseudowires, where the active status enables data transfers along corresponding PW data paths and the standby status disables data transfers along corresponding PW data paths. The method may then include detecting a failure on the first control path, and in response to the detected failure, using the group identifiers to assign the active status to the backup pseudowires and the standby status to the primary pseudowires.

Introduction

Pseudowires are used in pseudowire emulation edge-to-edge to provide a Layer 2 Virtual Private Network (L2VPN) connection. When large numbers (e.g., 4,000-6,000) of pseudowires are aggregated together on a single router, failure performance tends to be linear or O(n) where n is the number of pseudowires. While O(n) performance may be acceptable for small numbers of pseudowires, the effect on network outages can be increasingly undesirable as the number of pseudowires increases.

For example, a cell-site router will typically start an approximately 2-minute procedure if contact with its controller, which is reached via a pseudowire, is lost for more than some threshold amount (e.g., between approximately 0.75 and 1.75 seconds in some cases). This can be a major impediment to the scalability of pseudowire deployments. These issues have become increasingly relevant as providers of Multiservice Broadband Networks (MBNs) are rapidly replacing or augmenting their traditional Synchronous Optical Networking (SONET) equipment with cheaper Ethernet equipment in the evolution towards a 4G (i.e., $4^{th}$ generation) network.

One aspect of a solution to the problem of pseudowire failure is the deployment of redundant pseudowires. For example, redundant pseudowires have been used in the context of Multiprotocol Label Switching (MPLS) networks, which use a Label Distribution Protocol (LDP) to manage labels for forwarding traffic between routers. In this context, general requirements for redundancy schemes have been developed so that duplicate pseudowires are available when a given pseudowire fails (e.g., by using active/standby status indicators). In addition, more specific implementations for redundant pseudowires have also been developed.

FIG. 1 shows a reference network model 102 with applications to example embodiments disclosed herein. The reference network model 102 includes an aggregation network 104 of PE nodes and a distribution network 106 of PE nodes between a radio network controller (RNC) (or base station controller (BSC)) 108 on the core side of the model 102 and a radio tower 111 on the tower side of the model 102. Switching provider edge nodes S-PE1 and S-PE2 connect the two networks 104, 106. On the core side, two core terminating provider edges T-PE1 and T-PE2 connect to the RNC/BSC 108 through attachment circuits 110, 112. On the tower side, one tower terminating provider edge T-PE connects to the radio tower 111 through an attachment circuit 114.

Additionally as noted in FIG. 1, peer-PE monitoring is carried out within each network 104, 106. That is, there is peer-PE monitoring between provider edges that share a segment, for example, by multi-hop bidirectional forwarding detection (BFD). Alternatively, peer monitoring can be accomplished by other means (e.g., MPLS-TP (Transport Protocol) keep-alives). This peer-PE monitoring is used to provide the mechanism for fast failure detection. Once a failure is detected, the network can react by "rerouting" the failed pseudowires to pre-provisioned backup paths and thus provide a minimal disruption in service to the end-user. This rerouting can be accomplished by LDP signaling between provider edges.

Within the distribution network 106 pseudowire connections are shown between the core T-PEs and the S-PEs, and within the aggregation network 104 pseudowire connections between the tower T-PE and the S-PEs are similarly shown. Pseudowire status indicators are also shown where "A" indicates active status and "S" indicates standby status. Further "A (nf)" indicates active status but not forwarding, so that the pseudowire can quickly switch to forwarding data (e.g., also known as Hot Standby Pseudowire (HSPW)). In this example, a single active pseudowire (i.e., a multi-segment pseudowire (MS-PW)) connects T-PE1 to T-PE including a first pseudowire segment 116 from T-PE1 to S-PE1 and a second pseudowire segment 118 from S-PE1 to T-PE. An active but non-forwarding pseudowire connects T-PE1 to T-PE including a first pseudowire segment 120 from T-PE1 to S-PE2 and a second pseudowire segment 122 from S-PE2 to T-PE. A standby pseudowire connects T-PE2 to T-PE including a first pseudowire segment 124 from T-PE2 to S-PE1 and a second pseudowire segment 126 from S-PE1 to T-PE. Another standby pseudowire connects T-PE2 to T-PE including a first pseudowire segment 128 from T-PE2 to S-PE2 and a second pseudowire segment 130 from S-PE2 to T-PE. Although single pseudowires are represented in FIG. 1, the drawn lines may indicate multiple pseudowire (e.g., hundreds) depending on the system requirements.

In some operational settings the tower T-PE may actually be a cell-site T-PE, in which case the tower T-PE aggregates more than one tower into a single router. There are also deployments that include redundancy at the tower location by using two cell-site T-PE routers for redundant connections to the towers. However, these connections do not typically utilize HSPW, but rather a hardware-based approach that provides high-availability of the tower connections.

Figure 2:
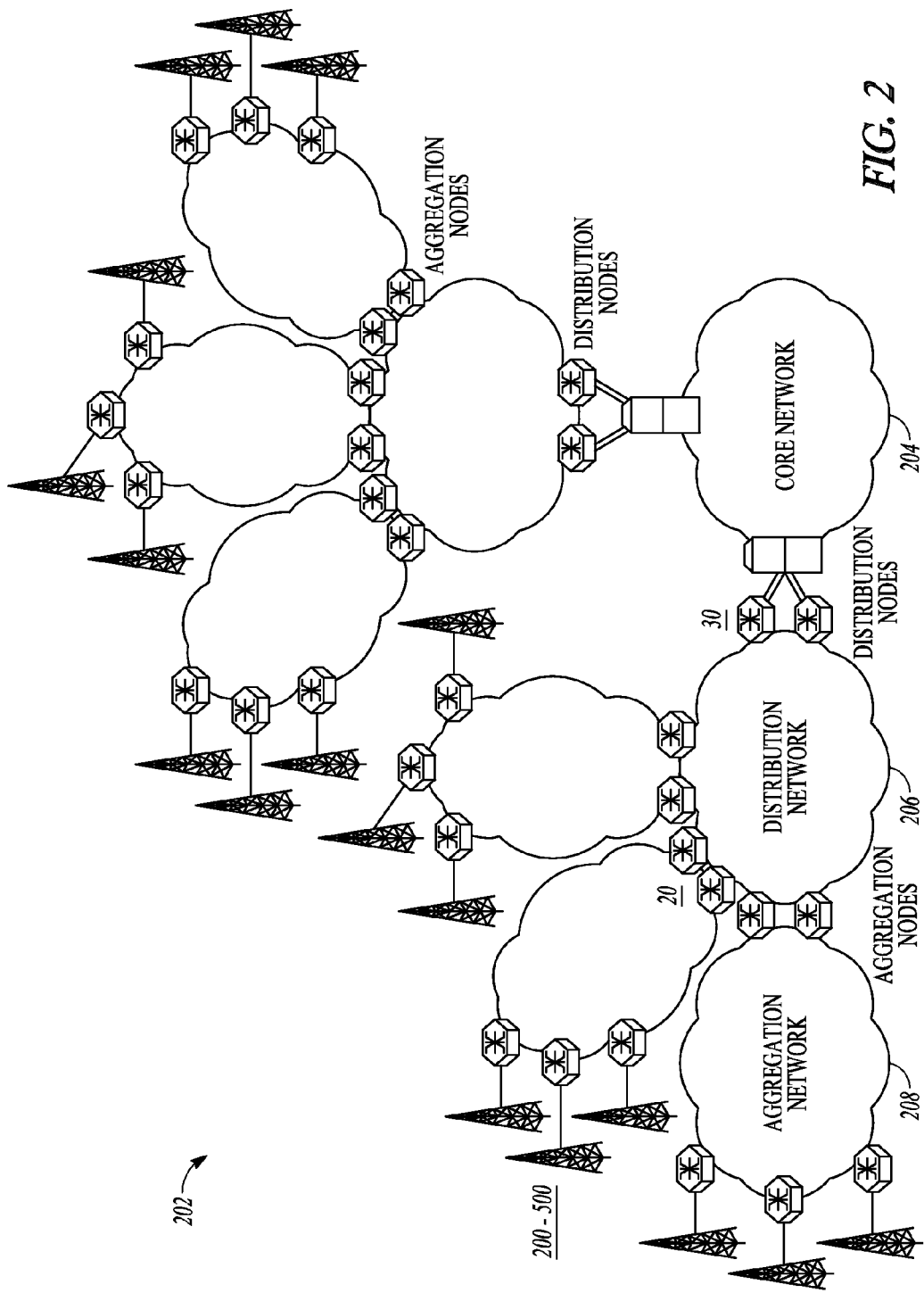
FIG. 2 shows a hub-and-spoke model related to the reference model shown in FIG. 1.

The reference network model 102 may be considered as part of a larger hub-and-spoke model as shown in FIG. 2. A hub-and-spoke distribution model 202 includes a core network 204, distribution networks 206, and aggregation networks 208. Network elements including distribution nodes, aggregation nodes, and towers are also shown with nominal count values (e.g., 30 distribution nodes between the core network 204 and a distribution network 206). In this model 202, tower T-PEs are the spokes while core-PEs constitute the hub. Dozens to hundreds of tower T-PEs connect to a few S-PEs; these S-PEs are quite similar to ASBRs as they act as forwarders between the two distinct MPLS domains, providing isolation and, in the case of mobility, aggregation services. Typically, several aggregation networks 208 are connected to a single distribution network 206, eventually connecting the tower with the core router that connects the tower's ACs to the RNC/BSC. There are typically several distribution networks in a Radio Access Network (RAN) connected to the service provider's core Internet Protocol (IP) network.

Depending on the requirements of the operational setting, there may be a maximum target of 6000 active pseudowires per distribution T-PE. In some cases Tower T-PEs may use between 3 and 12 pseudowires each. Then 6000 pseudowires would therefore handle between 2000 (3 PWs per tower) and 500 (12 PWs per tower) tower T-PEs. Note that in a redundant configuration with 6,000 active pseudowires there would also be 6000 HSPWs for a total of 12,000 pseudowires. Typically, mobile service providers (MSPs) are most concerned with the health of their core T-PEs, their large aggregators or hubs. Tower T-PEs (the spokes) are typically less important as they generally have overlapping areas of wireless coverage, have the lowest level of aggregation, and, thereby, impact the least number of users. The importance of the S-PE lies somewhere in the middle.

Figure 3:
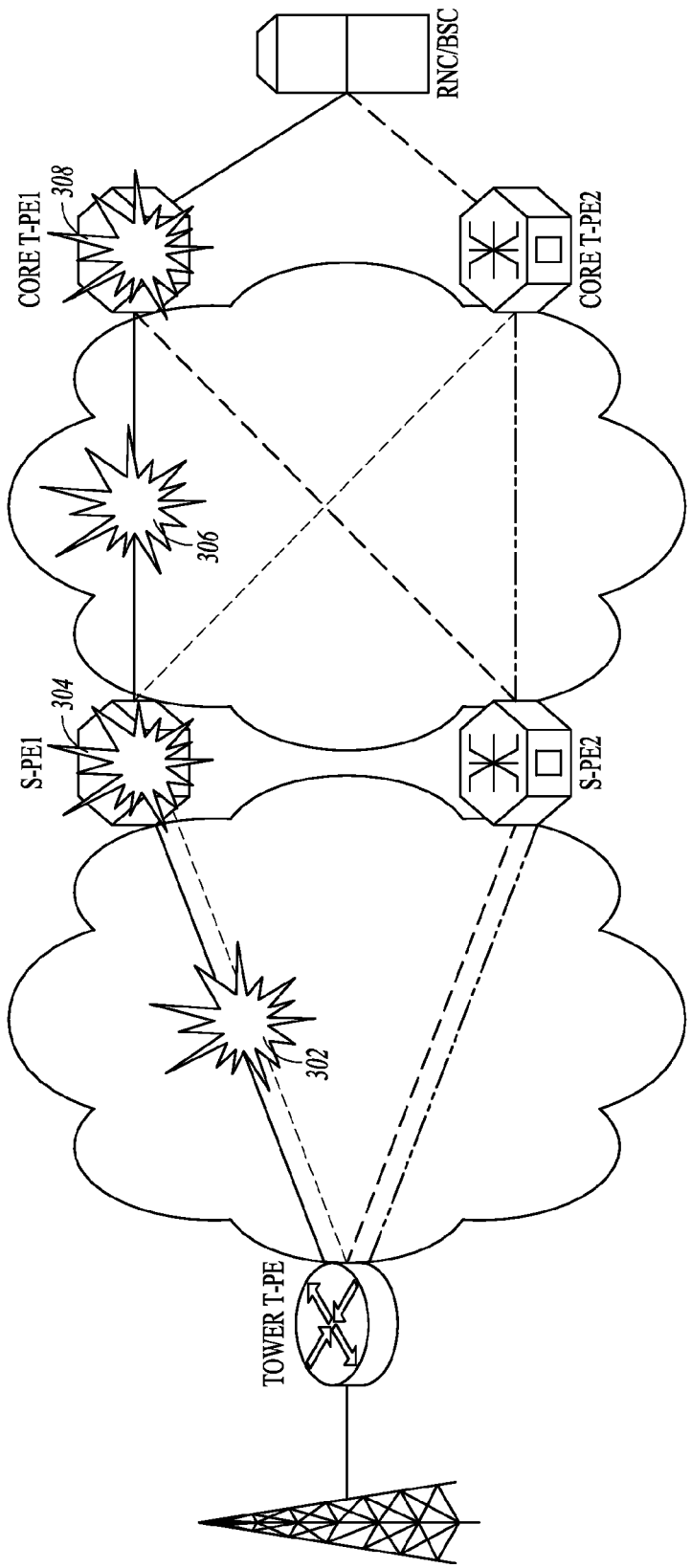
FIG. 3 shows example failure modes for the model shown in FIG. 1.

With reference to FIG. 1, FIG. 3 shows a variety of failure modes encountered in the reference network model 102. Failure 302 of communications between tower T-PE and the S-PE can be detected via peer monitoring when both the S-PE and the T-PE are still active/alive. For example, this failure may be due to a loss of connectivity when the BFD session goes down. Failure 304 of S-PE1 can be due to a hardware failure, power outage, or the lack of BFD-session maintenance capability (e.g., if the BFD-session hello timers cannot be serviced for the prescribed period of time). Failure 306 of communications between S-PE1 and core T-PE1 can be detected via peer monitoring when both S-PE1 and core T-PE1 are still active/alive. Failure 308 at core T-PE1 can be due to a hardware failure, power outage, or the lack of BFD-session maintenance capability.

Figure 4:
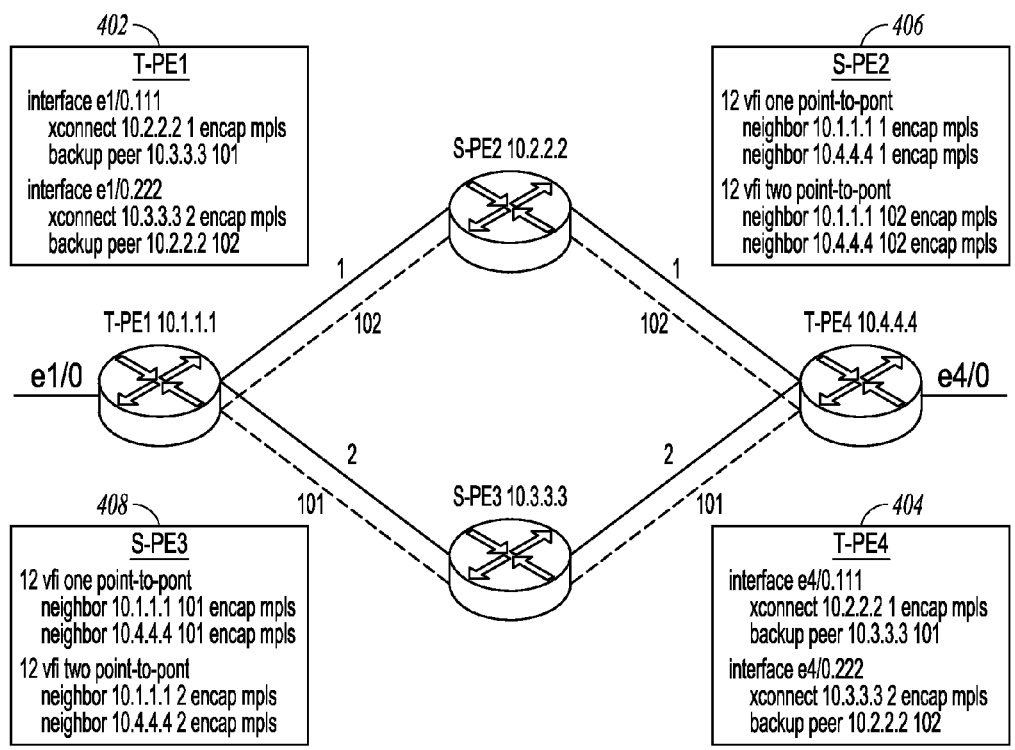
FIG. 4 shows details for PW connectivity in an exemplary network for an example embodiment.

Pseudowire connectivity is further illustrated in FIG. 4 where the illustrated network includes four nodes: T-PE1 (10.1.1.1), S-PE2 (10.2.2.2), S-PE3 (10.3.3.3), and T-PE4 (10.4.4.4). For the terminating nodes T-PE1 and T-PE4, specifications for VLANs (virtual Local Area Networks) connections (i.e., pseudowires) are shown using the Internet Operating System Command Line Interface (IOS CLI). The specification 402 for T-PE1 defines two VLANS as primary/backup combinations of virtual circuits for the network. The first three lines of the specification 402 define "VLAN 111" beginning with a specification of the hardware interface e1/0 of T-PE1 (10.1.1.1) and the label for "VLAN 111" in the first line. The second line uses the "xconnect" statement to specify a virtual circuit from that interface to S-PE2 (10.2.2.2) with a virtual circuit Identification (VCID) set as VCID=1, and the third line uses the "backup peer" statement to specify another virtual circuit from that interface to S-PE3 (10.3.3.3) with VCID=101. The next three lines of the specification 402 define "VLAN 222" beginning with a specification of the hardware interface e1/0 of T-PE1 (10.1.1.1) and the label for "VLAN 222" in the fourth line. The fifth line uses the "xconnect" statement to specify a virtual circuit from that interface to S-PE3 (10.3.3.3) with VCID=2, and the sixth line uses the "backup peer" statement to specify another virtual circuit from that interface to S-PE2 (10.2.2.2) with VCID=102. These virtual circuits, VCID=1, VCID=2, VCID=101 and VCID=102 are shown in the figure between T-PE1 and the S-PEs with a solid line for the primary circuits VCID=1 and VCID=2 and a dashed line for the backup circuits VCID=101 and VCID=102.

Similarly, the specification 404 for T-PE4 defines two VLANS as primary/backup combinations of virtual circuits for the network. The first three lines of the specification 404 define "VLAN 111" beginning with a specification of the hardware interface e4/0 of T-PE4 (10.4.4.4) and the label for "VLAN 111" in the first line. The second line uses the "xconnect" statement to specify a virtual circuit from that interface to S-PE2 (10.2.2.2) with VCID=1, and the third line uses the "backup peer" statement to specify another virtual circuit from that interface to S-PE3 (10.3.3.3) with VCID=101. These virtual circuits, VCID=1 and VCID=101, are shown in the figure with a solid line for the primary VCID=1 and a dashed line for the backup VCID=2. The next three lines of the specification 404 define "VLAN 222" beginning with a specification of the hardware interface e1/0 of T-PE1 (10.1.1.1) and the label for "VLAN 222" in the fourth line. The fifth line uses the "xconnect" statement to specify a virtual circuit from that interface to S-PE3 (10.3.3.3) with VCID=2, and the sixth line uses the "backup peer" statement to specify another virtual circuit from that interface to S-PE2 (10.2.2.2) with VCID=102. These virtual circuits, VCID=1, VCID=2, VCID=101 and VCID=102 are shown in the figure between T-PE4 and the S-PEs with a solid line for the primary circuits VCID=1 and VCID=2 and a dashed line for the backup circuits VCID=101 and VCID=102.

The specifications 406, 408 for the switching nodes S-PE2 and S-PE3 join the virtual circuits so that the locally defined VCIDs indicate consistent paths across the switching nodes. The first three lines of the specification 406 for S-PE2 connect VCID=1 from T-PE1 (10.1.1.1) with VCID=1 from T-PE4 (10.4.4.4), and the next three lines connect VCID=102 from T-PE1 (10.1.1.1) with VCID=102 from T-PE4 (10.4.4.4). Similarly, the first three lines of the specification 408 for S-PE3 connect VCID=101 from T-PE1 (10.1.1.1) with VCID=101 from T-PE4 (10.4.4.4), and the next three lines connect VCID=2 from T-PE1 (10.1.1.1) with VCID=2 from T-PE4 (10.4.4.4).

With respect to T-PE1 in FIG. 4, although "VLAN 111" and "VLAN 222" share the same hardware port, they do not share the same "control path disposition." That is, "VLAN 111" is primary to S-PE2 (VCID=1) and standby to S-PE3 (VCID=101), while "VLAN 222" has an opposite configuration since it is primary to S-PE3 (VCID=2) and standby to S-PE2 (VCID=102). As discussed below, certain embodiments group pseudowires according to "control path disposition" (e.g., xconnect configuration) as well as the hardware interface in order to improve failover performance. That is, to deal with both hardware port failures and switching path failures, the grouping criteria also considers the cross connects. In this case, on T-PE1 as well as T-PE4, there would exist two groups: one for active to S-PE2 and standby to S-PE3 and another for active to S-PE3 and standby to S-PE2 (i.e., the inverse configuration).

Figure 5:
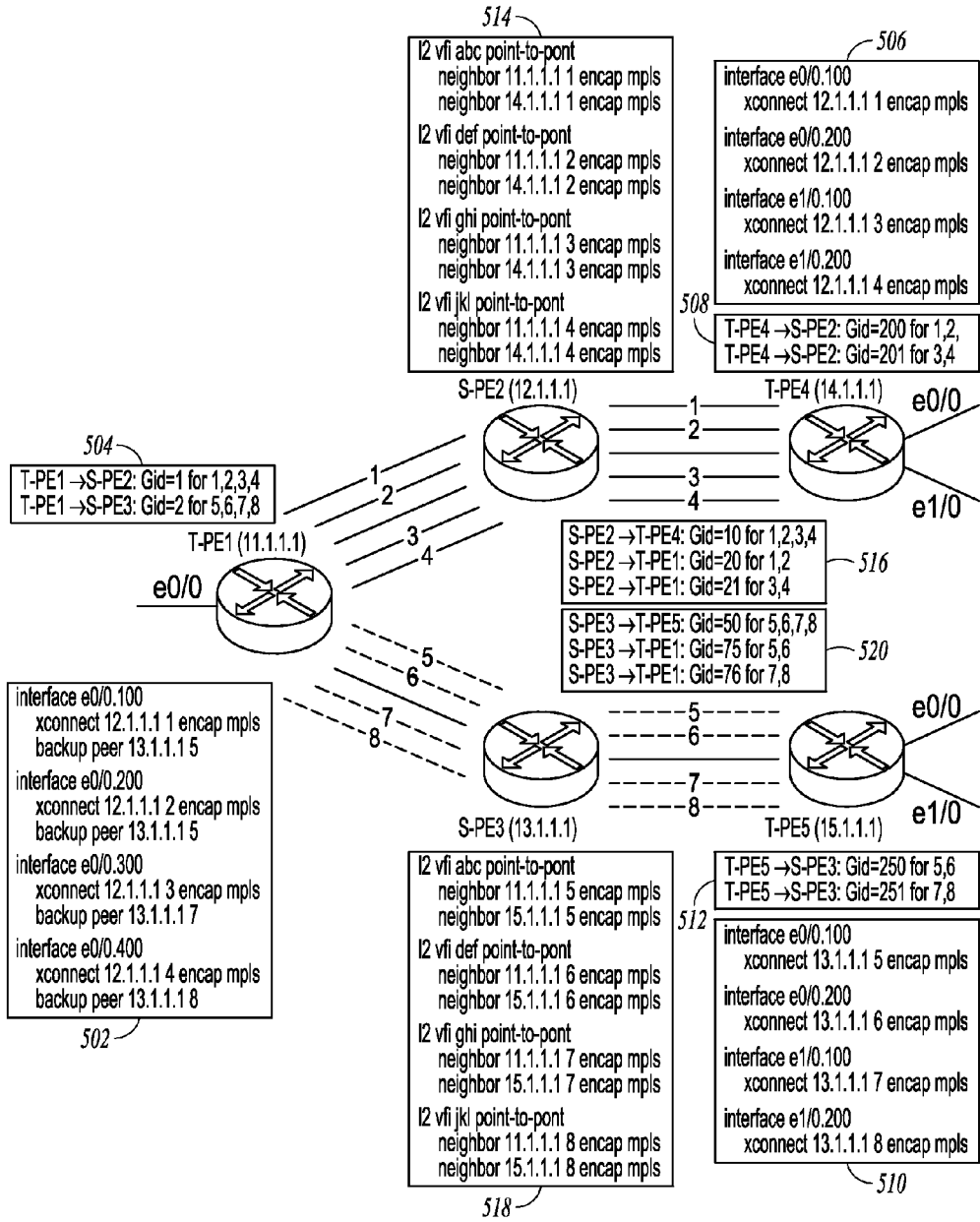
FIG. 5 shows details for PW grouping for an example embodiment.

First, local connectivity is characterized by local group identifications (Group-IDs), which depend on whether the allocation is done at a T-PE or S-PE. FIG. 5 shows an embodiment that illustrates an allocation of local group IDs in a network including terminating nodes T-PE1 (11.1.1.1), T-PE4 (14.1.1.1), and T-PE5 (15.1.1.1) and switching nodes S-PE2 (12.1.1.1) and S-PE3 (13.1.1.1). The specification 502 for T-PE1 determines corresponding local group IDs 504 based on the hardware interface and the control path. In this case, Group-ID=1 corresponds to VCID=1, VCID=2, VCID=3, and VCID=4, and the Group-ID=2 corresponds to VCID=5, VCID=6, VCID=7, and VCID=8.

Similarly, the specification 506 for T-PE4 determines corresponding local group IDs 508 based on the hardware interface and the control path. In this case, the Group-ID=200 corresponds to VCID=1 and VCID=2 for hardware interface e0/0, and Group-ID=201 corresponds to VCID=3 and VCID=4 for hardware interface e1/0. The specification 510 for T-PE5 determines corresponding local group IDs 512 based on the hardware interface and the control path. In this case, Group-ID=250 corresponds to VCID=5 and VCID=6 for hardware interface e0/0, and the Group-ID=251 corresponds to VCID=7 and VCID=8 for hardware interface e1/0.

The switching nodes make different allocations in different directions. The specification 514 for S-PE2 determines corresponding local group IDs 516 based on the hardware interface and the control path in either direction. In the direction towards T-PE4, Group-ID=10 corresponds to VCID=1, VCID=2, VCID=3, and VCID=4. In the direction towards T-PE1, Group ID=20 corresponds to VCID=1 and VCID=2, and Group-ID=21 corresponds to VCID=3 and VCID=4. Similarly, the specification 518 for S-PE3 determines corresponding local group IDs 520 based on the hardware interface and the control path in either direction. In the direction towards T-PE5, Group-ID=50 corresponds to VCID=5, VCID=6, VCID=7, and VCID=8. In the direction towards T-PE1, Group-ID=75 corresponds to VCID=5 and VCID=6, and Group-ID=76 corresponds to VCID=7 and VCID=8.

Figure 6:
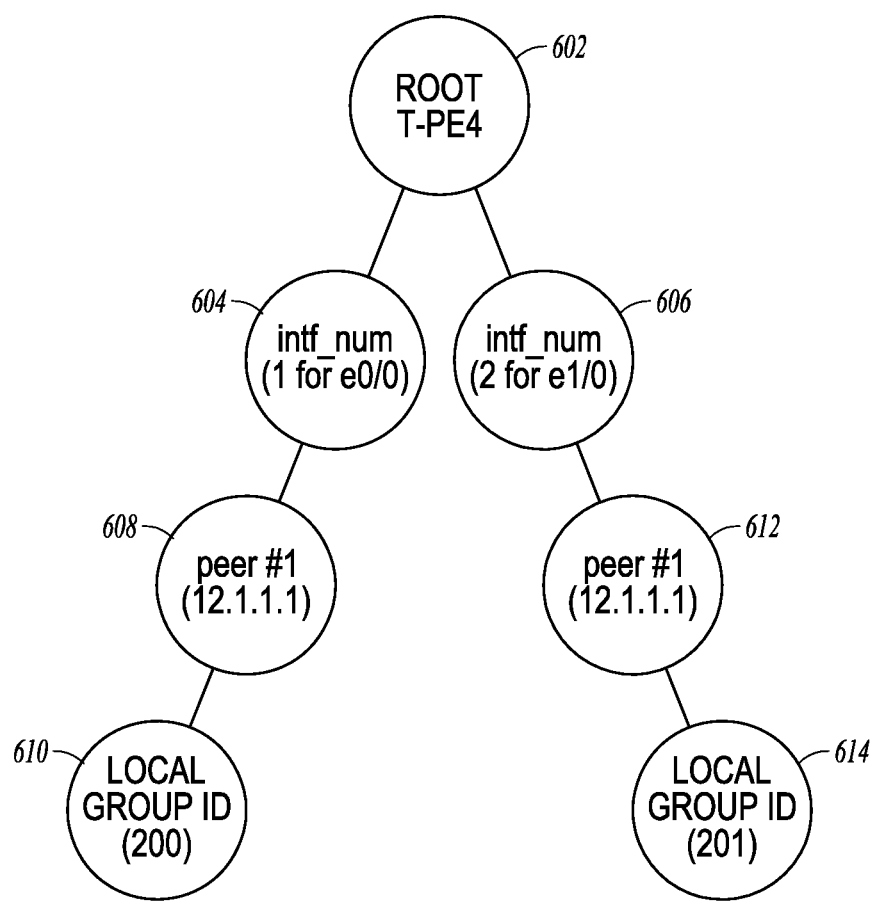
FIG. 6 shows an example database element for local group identification without PW redundancy in an example embodiment.

Local group IDs are maintained in a database so that pseudowire redundancy is also maintained. First, in a case without pseudowire redundancy, all the xconnect configurations from the same physical interface to the same peer are assigned the same local group ID. So, for example, in Ethernet cases all xconnect configurations under sub-interfaces of the same physical interface to the same peer will be assigned the same local group ID (e.g., e0/0 and e0/1 are sub-interfaces of e0). FIG. 6 shows a database representation for T-PE4 from FIG. 5. From the root node 602 for T-PE4, there is a first interface node 604 for e0/1 and a second interface node 606 for e1/0. The first interface node 604 is configured towards a single peer node (12.1.1.1) 608 and is thus assigned a single local group ID (Group-ID=200) 610. Similarly, the second interface node 606 is configured towards a single peer node (12.1.1.1) 612 and is thus assigned a single local group ID (Group-ID=201) 614. In this case from the assignment of local group IDs 508 in FIG. 5, Group-ID=200 corresponds to VCID=1 and VCID=2, which are under hardware interface e0/0 and configured towards the same peer, S-PE2 (12.1.1.1). Both pseudowires (VCID=1 and VCID=2) are assigned the same local group ID (Group-ID=200) in this case, and this is advertised in label mapping messages towards the remote provider edge, i.e., S-PE2. Similarly, from the assignment of local group IDs 508 in FIG. 5, T-PE4 has VCID=3 and VCID=4 under the physical interface e1/0 going to the same peer S-PE2 (12.1.1.1), and the local Group ID (Group-ID=201) is assigned to these VCs.

Figure 7:
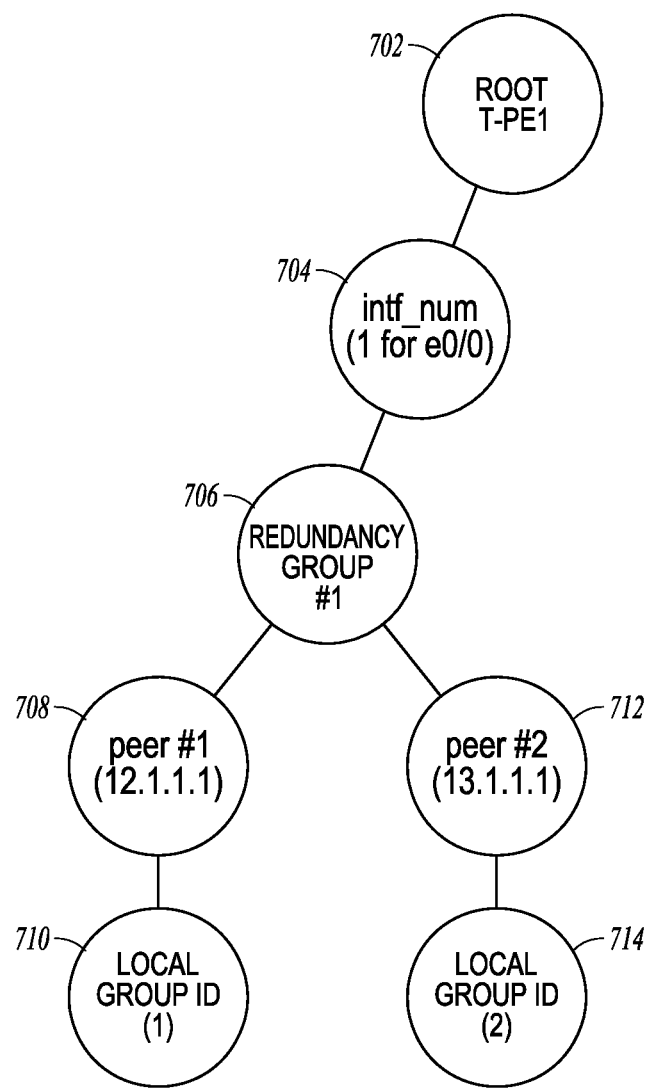
FIG. 7 shows an example database element for local group identification with PW redundancy in an example embodiment.

For the pseudowire redundancy case, a separate redundancy-group database is maintained by the xconnect application. This redundancy-group database contains the peer IDs in the group and the local group IDs advertised to them. This is needed to maintain a 1:1 mapping between the primary pseudowires and their corresponding backup pseudowires. FIG. 7 shows a database representation for T-PE1 from FIG. 5. From the root node 702 for T-PE1, there is an interface node 704 for e0/0 and a redundancy group node 706 that shows connections for configurations to a first peer node (12.1.1.1) 708, which is assigned a local group ID (Group-ID=1) 710, and a second peer node (13.1.1.1) 712, which is assigned a local group ID (Group-ID=2) 714. In this case, Group-ID=1 corresponds to VCID=1, VCID=2, VCID=3, and VCID=4, which are under hardware interface e0/0 and configured towards the same peer, S-PE2 (12.1.1.1). These pseudowires are assigned the same group ID (Group-ID=1) in this case, and this is advertised in label mapping messages towards the remote provider edge, i.e., S-PE2. Similarly from the assignment of local group IDs 504 in FIG. 5, T-PE1 has VCID=5, VCID=6, VCID=7, and VCID=8 under the physical interface e0/0 going to another peer S-PE3 (13.1.1.1), and the local group ID (Group-ID=2) is assigned to these VCs. In this case these local group IDs are organized as a redundancy group 706.

Pseudowire grouping allows multiple pseudowires to be aggregated together when signaling either label withdrawals or status changes between segment end-point provider edges. This signaling can be carried out through LDP grouping TLV (Type Length Value). For example, when a PE node fails (e.g., failure 304 of S-PE1), aggregating the inter-segment PE signaling using the grouping TLV can provide significant scaling advantages. This allows all pseudowires sharing a physical port and PW configuration (e.g., xconnect configuration) to be signaled en masse between segment-adjacent provider edges.

Figure 8:
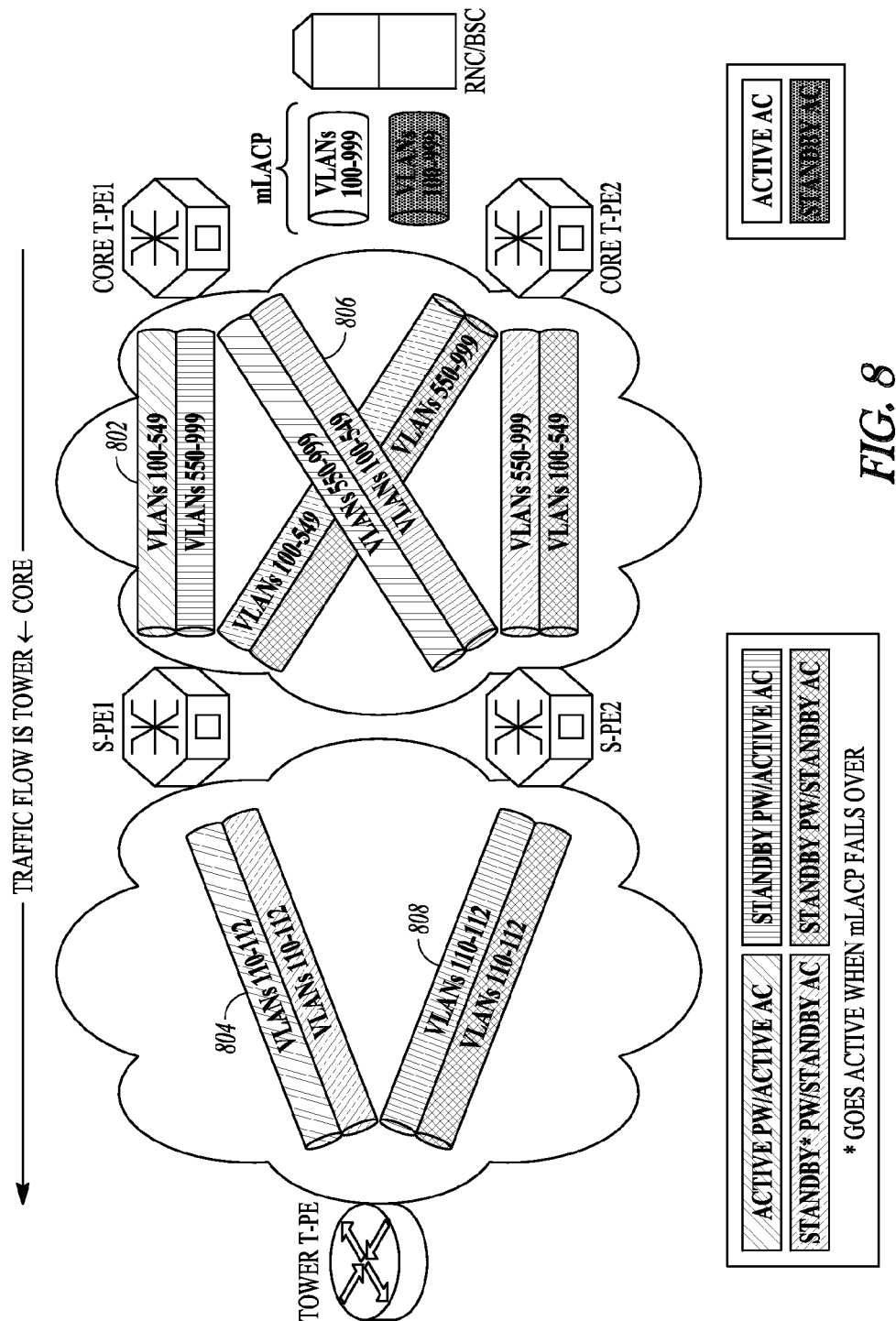
FIG. 8 shows an example network including redundant PW connections for an example embodiment.

FIG. 8 shows an example based on FIG. 1 where VLAN ACs are shown as grouped by both port/HW-interface and pseudowire-class. The grouping criterion allows all "similar" pseudowires to be signaled together: All the grouped pseudowires share the same port and next-hop provider edge. Additionally, the figure contains many pseudowires, each grouped into a shaded tube. For example, the tube labeled "VLANs 100-549" contains 450 pseudowires grouped together. This figure depicts an incoming Ethernet comprised of 900 VLANs being segmented in two with 450 VLANs (100-549) active to S-PE1 while the other half of the VLANs (550-999) being active to S-PE2. This might be considered a type of manual load balancing. Furthermore, the aggregation network is only showing a single tower and the VLANs associated with it; other VLAN destinations are not shown in the figure.

"VLANs 110-112" are active along a first pseudowire path 802 from Core T-PE1 to S-PE1 and a second pseudowire path 804 from S-PE1 to Tower T-PE. When a failure occurs at S-PE1 (e.g., as the switching node failure 304 shown in FIG. 3), then the standby pseudowires become active for "VLANs 110-112" along a first pseudowire path 806 from Core T-PE1 to S-PE2 and a second pseudowire path 808 from S-PE2 to Tower T-PE.

The standby pseudowires in FIG. 8 can be configured as HSPWs, a configuration that enables ACs to quickly failover to pre-provisioned pseudowires that are in active state but set to not-forwarding. Then when a failure occurs, switching over to these pre-provisioned HSPWs occurs quickly by switching from not-forwarding status to forwarding status.

Figure 9:
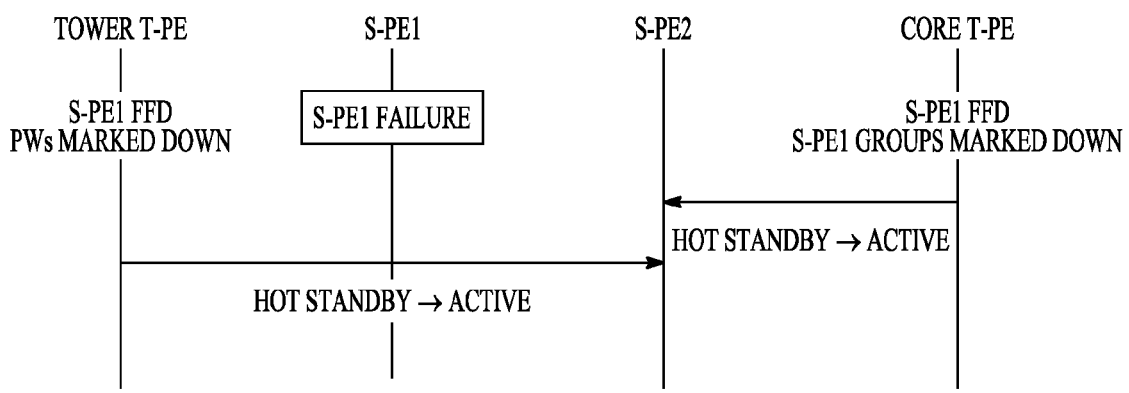
FIG. 9 shows an example sequence diagram for a failure mode related to the embodiment shown in FIG. 8.

FIG. 9 shows a UML (Unified Modeling Language) sequence diagram of signaling events related to the failover procedure illustrated in FIG. 8 for a switching node failure 304. The Tower T-PE and the Core T-PE independently detect a failure at S-PE1 (e.g., BFD forwarding with LDP signaling), and then mark down the status of the currently active pseudowires routed through S-PE1 and mark up the status of the standby pseudowires routed through S-PW2. Other failure modes shown in FIG. 3 can be handled similarly.

In general, it is desirable for MPLS-based Ethernet networks to react quickly to failures, so proactive detection mechanisms are employed in order to pick up system failures quickly. All proactive monitoring is typically done between PE peers on a single MPLS network. These provider edges on the edges of the MPLS network act similarly to an Autonomous System Boundary Router (ASBR). As a result, related embodiments detect control path failures, which may not be the same as pseudowire data path failures. That is, the data packets and control packets may take different paths between provider edges in a MPLS network although typically these paths are coincident. Thus, when the control and data paths are not coincident, if the control path fails, then all pseudowires utilizing the control path are marked as failed. As a corollary, if the data path fails and the control path remains healthy, then failure will not be detected from monitoring the control path.

A failure of a monitored provider edge initiates a switchover of all active pseudowires using the failing provider edge to their configured HSPWs (if they exist). Grouping can greatly reduce the number of messages needed between provider edges (Inter-PE Aggregation) and within a single provider edge (Intra-PE Aggregation). Furthermore, the MPLS network itself may be internally resilient deploying technologies such as, but not limited to, MPLS-TE (MPLS Traffic Engineering) and FRR (Fast Reroute). The paths across the MPLS network may recover quickly and might not trip the fault-monitoring systems.

Example Method Embodiment

Figure 10:
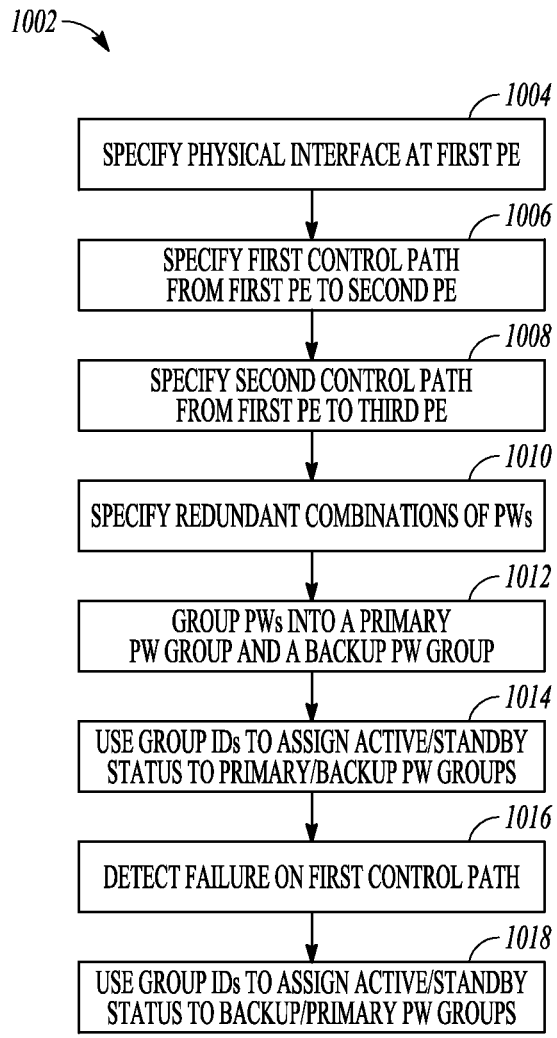
FIG. 10 shows a flowchart that illustrates a method of providing improved PW grouping according to an example embodiment.

With reference to the above discussion, FIG. 10 shows a method 1002 of providing improved PW grouping according to an example embodiment. In a first operation 1004 of the method 1002, a physical interface is specified at a first PE node in a network. In a second operation 1006, a first control path is specified from the first PE node to a second PE node in the network. In a third operation 1008, a second control path is specified from the first PE node to a third PE node in the network. These control paths related to a common physical interface can be used to characterize redundant pairs of pseudowires.

In a fourth operation 1010, redundant combinations of pseudowires are specified, where each redundant combination includes a primary pseudowire that is configured as a virtual circuit between the physical interface of the first PE node and the second PE node and a backup pseudowire that is configured as a virtual circuit between the physical interface of the first PE node and the third PE node. Although a redundant combination may relate a single backup pseudowire to a given primary pseudowire, in some cases multiple backup pseudowires will be related to a given primary pseudowire for increased redundancy. In a fifth operation 1012, these pseudowires are grouped into a primary PW group that includes the primary pseudowires and a backup PW group that includes the backup pseudowires. In a sixth operation 1014, group identifiers for the primary PW group and the backup PW group are used to assign an active status to the primary pseudowires and a standby status to the backup pseudowires, where the active status enables data transfers along corresponding PW data paths and the standby status disables data transfers along corresponding PW data paths.

In an optional seventh operation 1016, a failure may be detected on the first control path, and in an optional eighth operation 1018, in response to the detected failure, the group identifiers may be used to assign the active status to the backup pseudowires and the standby status to the primary pseudowires. For example, the failure on the first control path may be detected by using BFD packet streams between PE nodes of the network. Then the detected failure can be signaled to PE nodes in the network by sending LDP status updates between PE nodes in the network. Then, after receiving the failure detection signals, the group identifiers can be used again to assign the active status to the backup pseudowires and the standby status to the primary pseudowires by sending LDP status updates between PE nodes in the network.

Typically the network in is an MPLS network and the PE nodes are routers that provide network services to connected CE nodes of a customer network. In general, each control path is an Internet Protocol (IP) routing path between PE nodes in the network and each data path is a label switched path (LSP) between PE nodes in the network.

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus or computer may be configured as a system that includes one or more units, each of which is configured to carry out some aspects of the method either in software, in hardware or in some combination thereof. For example, the system may be configured as part of a computer network that includes the Internet. At least some values for the results of the method can be saved for later use in a computer-readable medium, including memory units (e.g., RAM (Random Access Memory), ROM (Read Only Memory)) and storage devices (e.g., hard-disk systems, optical storage systems).

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII). In some contexts, the computer-readable medium may be alternatively described as a computer-useable medium, a computer-storage medium, a computer-program medium, machine-readable medium or some alternative non-transitory storage medium. Depending on the operational setting, specified values for the above-described methods may correspond to input files for the computer program or computer.

Example Modular Apparatus Embodiment

Figure 11:
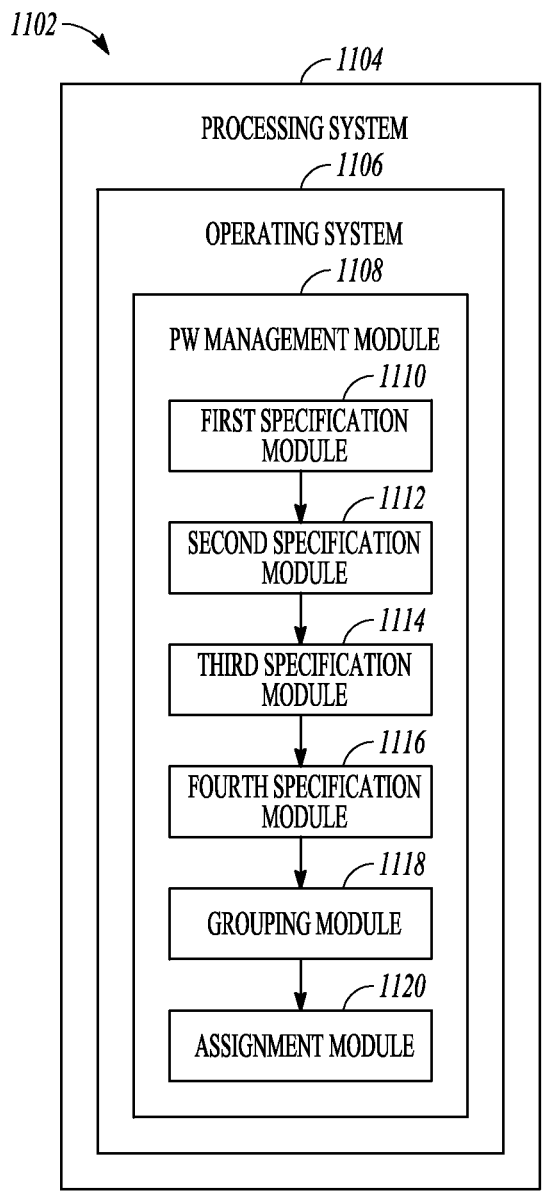
FIG. 11 shows a schematic representation of an apparatus in accordance with an example embodiment.

FIG. 11 shows a schematic representation of an apparatus 1102, in accordance with an example embodiment. For example, the apparatus 1102 may be used to implement the method 1002 of providing improved pseudowire grouping as described above with reference to FIG. 10. The apparatus 1102 is shown to include a processing system 1104 that may be implemented on a server, client, or other processing device that includes an operating system 1106 for executing software instructions.

In accordance with an example embodiment, the apparatus 1102 includes a PW management module 1108 that includes a first specification module 1110, a second specification module 1112, third specification module 1114, a fourth specification module 1116, a grouping module 1118, and an assignment module 1120. The first specification module 1110 operates to specify a physical interface at a first PE node in a network. The second specification module 1112 operates to specify a first control path from the first PE node to a second PE node in the network. The third specification module 1114 operates to specify a second control path from the first PE node to a third PE node in the network. The fourth specification module 1116 operates to specify redundant combinations of pseudowires, where each redundant combination includes a primary pseudowire that is configured as a virtual circuit between the physical interface of the first PE node and the second PE node and a backup pseudowire that is configured as a virtual circuit between the physical interface of the first PE node and the third PE node.

The grouping module 1118 operates to group the pseudowires into a primary PW group that includes the primary pseudowires and a backup PW group that includes the backup pseudowires. The assignment module 1120 operates to use group identifiers for the PW groups to assign an active status to the primary pseudowires and a standby status to the backup pseudowires. The active status enables data transfers along corresponding PW data paths and the standby status disables data transfers along corresponding PW data paths.

Example Machine Architecture and Machine-Readable Medium

Figure 12:
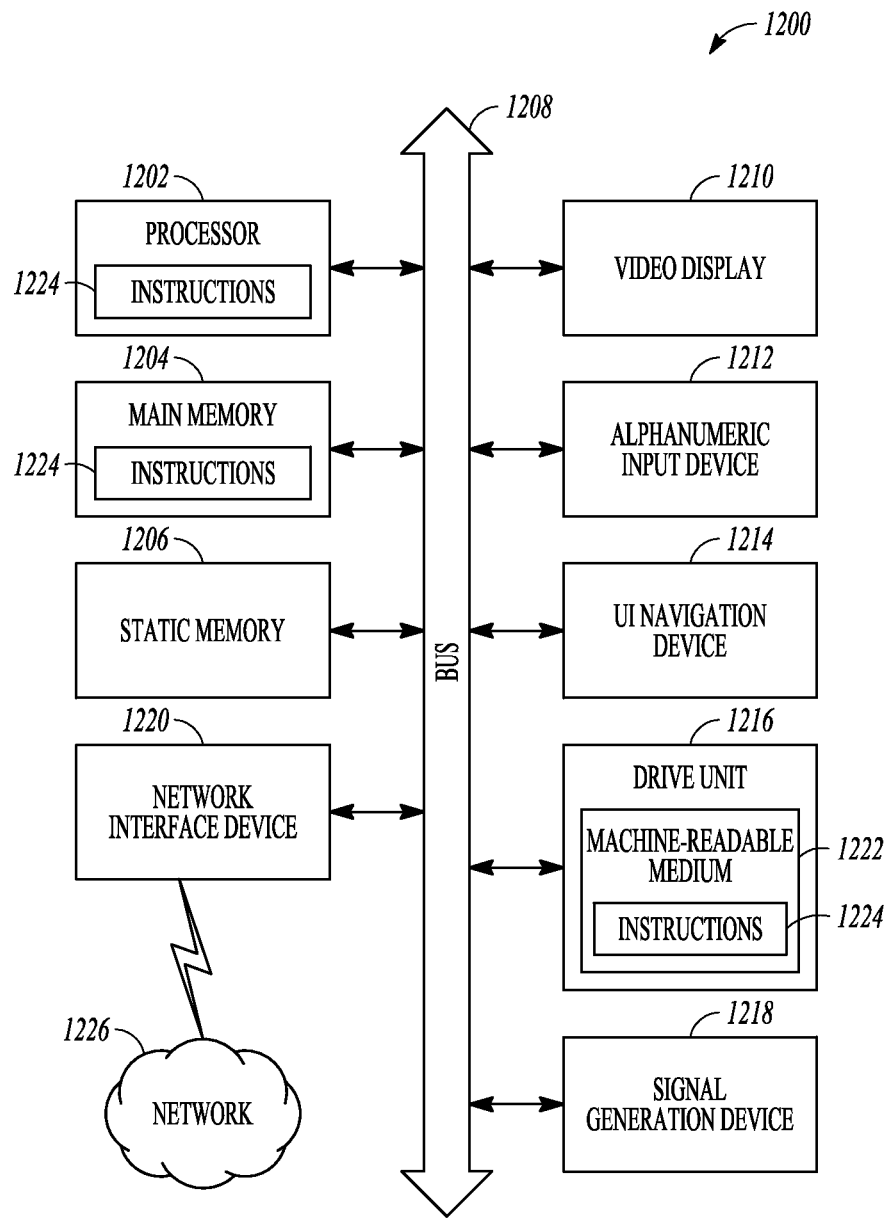
FIG. 12 shows a block diagram of a computer processing system within which a set of instructions for causing the computer to perform any one of the methodologies discussed herein may be executed.

FIG. 12 is a block diagram of a machine in the example form of a computer system 1200 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

In some contexts, a computer-readable medium may be described as a machine-readable medium. The disk drive unit 1216 includes a machine-readable medium 1222 on which is stored one or more sets of instructions and data structures (e.g., software) 1224 embodying or utilized by any one or more of the methodologies or functions described herein. The instructions may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more sets of instructions and data structures 1224. The term "machine-readable medium" shall also be taken to include any tangible medium that is capable of storing, encoding or carrying instructions for execution by the machine and that cause the machine to perform any one or more of the methodologies disclosed herein, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Modules, Components and Logic

Certain embodiments are described herein as including logic or a number of components, modules, or mechanisms. Modules may constitute either software modules or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Conclusion

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method comprising:
    identifying a first pseudowire (PW) group of primary pseudowires configured as virtual circuits between a physical interface of a first provider edge (PE) node in a network and a second PE node in the network, the first PW group being assigned an active-status group identifier corresponding to an active status that enables data transfers along corresponding PW data paths between the first PE node and the second PE node;
    identifying a second PW group of backup pseudowires configured as virtual circuits between the physical interface of the first PE node and a third PE node in the network, the second PW group being assigned a standby-status group identifier corresponding to a standby status that disables data transfers along corresponding PW data paths between the first PE node and the third PE node, and each backup pseudowire of the second PW group being identified as the backup pseudowire for a corresponding primary pseudowire of the first PW group;
    detecting a failure on a control path between the first PE node and the second PE node; and
    in response to the detected failure, assigning to the second PW group an active-status group identifier corresponding to an active status that enables data transfers along the corresponding PW data paths between the first PE node and the third PE node, and assigning to the first PW group a standby-status group identifier corresponding to a standby status that disables data transfers along the corresponding PW data paths between the first PE node and the second PE node.

2. The method of claim 1, further comprising:
    using packet streams between PE nodes of the network to detect the failure on the control path between the first PE node and the second PE node; and
    signaling the detected failure by sending status updates between PE nodes in the network, the status updates including the assignment of the active-status group identifier to the second PW group and the assignment of the standby-status group identifier to the first PW group.

3. The method of claim 1, wherein the network is a multi-protocol label switching (MPLS) network and the PE nodes are routers that provide network services to connected customer edge (CE) nodes of a customer network.

4. The method of claim 1, wherein each control path in the network is an Internet Protocol (IP) routing path between PE nodes in the network and each data path in the network is a label switched path (LSP) between PE nodes in the network.

5. The method of claim 1, further comprising:
    using the group identifiers to assign status updates to the primary pseudowires and the backup pseudowires by sending Label Distribution Protocol (LDP) status updates between PE nodes in the network.

6. The method of claim 1, wherein at least one primary pseudowire in the first PW group corresponds to a plurality of backup pseudowires in the second PW group.

7. The method of claim 1, wherein each primary pseudowire is associated with a corresponding data path for transferring data along a corresponding virtual circuit and a corresponding control path for detecting failures along the corresponding virtual circuit.

8. A non-transitory computer-readable medium that stores a computer program, the computer program including instructions that, when executed by at least one computer, cause the at least one computer to perform operations comprising:
    identifying a first pseudowire (PW) group of primary pseudowires configured as virtual circuits between a physical interface of a first provider edge (PE) node in a network and a second PE node in the network, the first PW group being assigned an active-status group identifier corresponding to an active status that enables data transfers along corresponding PW data paths between the first PE node and the second PE node;
    identifying a second PW group of backup pseudowires configured as virtual circuits between the physical interface of the first PE node and a third PE node in the network, the second PW group being assigned a standby-status group identifier corresponding to a standby status that disables data transfers along corresponding PW data paths between the first PE node and the third PE node, and each backup pseudowire of the second PW group being identified as the backup pseudowire for a corresponding primary pseudowire of the first PW group;
    detecting a failure on a control path between the first PE node and the second PE node; and
    in response to the detected failure, assigning to the second PW group an active-status group identifier corresponding to an active status that enables data transfers along the corresponding PW data paths between the first PE node and the third PE node, and assigning to the first PW group a standby-status group identifier corresponding to a standby status that disables data transfers along the corresponding PW data paths between the first PE node and the second PE node.

9. The computer-readable medium of claim 8, wherein the computer program further includes instructions that, when executed by the at least one computer, cause the at least one computer to perform operations comprising:

using packet streams between PE nodes of the network to detect the failure on the control path between the first PE node and the second PE node; and signaling the detected failure by sending status updates between PE nodes in the network, the status updates including the assignment of the active-status group identifier to the second PW group and the assignment of the standby-status group identifier to the first PW group.

10. The computer-readable medium of claim 8, wherein the network is a multi-protocol label switching (MPLS) network and the PE nodes are routers that provide network services to connected customer edge (CE) nodes of a customer network.

11. The computer-readable medium of claim 8, wherein each control path in the network is an Internet Protocol (IP) routing path between PE nodes in the network and each data path in the network is a label switched path (LSP) between PE nodes in the network.

12. The computer-readable medium of claim 8, wherein the computer program further includes instructions that, when executed by the at least one computer, cause the at least one computer to perform operations comprising:

using the group identifiers to assign status updates to the primary pseudowires and the backup pseudowires by sending Label Distribution Protocol (LDP) status updates between PE nodes in the network.

13. The computer-readable medium of claim 8, wherein at least one primary pseudowire in the first PW group corresponds to a plurality of backup pseudowires in the second PW group.

14. The computer-readable medium of claim 8, wherein each primary pseudowire is associated with a corresponding data path for transferring data along a corresponding virtual circuit and a corresponding control path for detecting failures along the corresponding virtual circuit.

15. An apparatus comprising:

at least one computer configured to perform operations for computer-implemented modules including:

a first identification module to identify a first pseudowire (PW) group of primary pseudowires configured as virtual circuits between a physical interface of a first provider edge (PE) node in a network and a second PE node in the network, the first PW group being assigned an active-status group identifier corresponding to an active status that enables data transfers along corresponding PW data paths between the first PE node and the second PE node;

a second identification module to identify a second PW group of backup pseudowires configured as virtual circuits between the physical interface of the first PE node and a third PE node in the network, the second PW group being assigned a standby-status group identifier corresponding to a standby status that disables data transfers along corresponding PW data paths between the first PE node and the third PE node, and each backup pseudowire of the second PW group being identified as the backup pseudowire for a corresponding primary pseudowire of the first PW group;

a failure-detection module to detect a failure on a control path between the first PE node and the second PE node; and an assignment module that, in response to the detected failure, operates to assign to the second PW group an active-status group identifier corresponding to an active status that enables data transfers along the corresponding PW data paths between the first PE node and the third PE node, and further operates to assign to the first PW group a standby-status group identifier corresponding to a standby status that disables data transfers along the corresponding PW data paths between the first PE node and the second PE node.

16. The apparatus of claim 15, wherein the assignment module further performs operations including:

using packet streams between PE nodes of the network to detect the failure on the control path between the first PE node and the second PE node; and signaling the detected failure by sending status updates between PE nodes in the network, the status updates including the assignment of the active-status group identifier to the second PW group and the assignment of the standby-status group identifier to the first PW group.

17. The apparatus of claim 15, wherein the network is a multi-protocol label switching (MPLS) network and the PE nodes are routers that provide network services to connected customer edge (CE) nodes of a customer network.

18. The apparatus of claim 15, wherein each control path in the network is an Internet Protocol (IP) routing path between PE nodes in the network and each data path in the network is a label switched path (LSP) between PE nodes in the network.

19. The apparatus of claim 15, wherein the assignment module further performs operations including:

using the group identifiers to assign status updates to the primary pseudowires and the backup pseudowires by sending Label Distribution Protocol (LDP) status updates between PE nodes in the network.

20. The apparatus of claim 15, wherein at least one primary pseudowire in the first PW group corresponds to a plurality of backup pseudowires in the second PW group.

* * * * *